(12) United States Patent
Oota (10) Patent No.: US 7,636,111 B2
(45) Date of Patent: Dec. 22, 2009

(54) IMAGE CAPTURING DEVICE HAVING A DISTORTION-REDUCTION UNIT CONFIGURED TO REDUCE GEOMETRICAL DISTORTION CAUSED BY AN IMAGING LENS IN AN IMAGE PROGRESSIVE SIGNAL

(75) Inventor: Makoto Oota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 548 days.

(21) Appl. No.: 11/251,294

(22) Filed: Oct. 14, 2005

(65) Prior Publication Data

US 2006/0092309 A1 May 4, 2006

(30) Foreign Application Priority Data

Oct. 28, 2004 (JP) .............................. 2004-314527

(51) Int. Cl.
*H04N 5/217* (2006.01)
*H04N 7/01* (2006.01)
*H04N 11/20* (2006.01)
*G06K 9/40* (2006.01)

(52) U.S. Cl. ......................... 348/241; 348/448; 382/275

(58) Field of Classification Search .............. 348/222.1, 348/240.2, 241, 251, 335, 340, 448, 452; 382/275; 358/3.26
See application file for complete search history.

(56) References Cited

U.S. PATENT DOCUMENTS

| 5,164,831 | A | * | 11/1992 | Kuchta et al. ............. 348/231.7 |
| 5,446,498 | A | * | 8/1995 | Boon .......................... 348/448 |
| 5,610,661 | A | * | 3/1997 | Bhatt ......................... 348/448 |
| 5,886,745 | A | * | 3/1999 | Muraji et al. ................ 348/448 |
| 5,905,530 | A |   | 5/1999 | Yokota et al. |
| 6,037,990 | A | * | 3/2000 | Ogawa et al. ............... 348/448 |
| 6,473,460 | B1 | * | 10/2002 | Topper ................... 348/E5.066 |
| 6,545,719 | B1 |   | 4/2003 | Trooper |
| 6,717,622 | B2 | * | 4/2004 | Lan ............................ 348/625 |
| 6,806,903 | B1 |   | 10/2004 | Okisu |
| 7,068,320 | B2 | * | 6/2006 | Tomizawa et al. ........... 348/448 |
| 7,286,187 | B2 | * | 10/2007 | Ha et al. ..................... 348/448 |
| 7,425,988 | B2 | * | 9/2008 | Okada et al. ............. 348/222.1 |
| 7,492,491 | B2 | * | 2/2009 | Saitoh ........................ 358/474 |
| 2001/0045988 | A1 | * | 11/2001 | Yamauchi et al. ........... 348/222 |
| 2002/0039139 | A1 | * | 4/2002 | Hsu et al. ................... 348/222 |
| 2003/0218692 | A1 | * | 11/2003 | Kaida et al. ................. 348/448 |
| 2005/0088573 | A1 | * | 4/2005 | MacInnis et al. ......... 348/426.1 |

FOREIGN PATENT DOCUMENTS

| CN | 1315806   | 10/2001 |
| JP | 01-114159 A | 5/1989 |

(Continued)

*Primary Examiner*—John M Villecco
(74) *Attorney, Agent, or Firm*—Canon U.S.A., Inc. I.P. Division (57) ABSTRACT

An image-capturing device includes an image-capturing unit that includes an imaging lens and an image-sensing element converting an image of a subject formed by the imaging lens to an electrical signal and that outputs an image signal based on an interlaced scan, a conversion unit that converts the image signal based on the interlaced scan from the image-capturing unit to an image signal based on a progressive scan, and a distortion-reduction unit that reduces geometrical distortion of the image signal based on the progressive scan from the conversion unit caused by the imaging lens.

8 Claims, 5 Drawing Sheets

FOREIGN PATENT DOCUMENTS

| | | |
|---|---|---|
| JP | 02-252375 A | 10/1990 |
| JP | 4-23575 A | 1/1992 |
| JP | 06-165024 A | 6/1994 |
| JP | 2003-125278 A | 4/2003 |
| JP | 2004-222109 A | 8/2004 |
| JP | 2004-260265 A | 9/2004 |

* cited by examiner

IMAGE CAPTURING DEVICE HAVING A DISTORTION-REDUCTION UNIT CONFIGURED TO REDUCE GEOMETRICAL DISTORTION CAUSED BY AN IMAGING LENS IN AN IMAGE PROGRESSIVE SIGNAL

BACKGROUND OF THE INVENTION

1. Field of the Invention

The present invention relates to an image-capturing device, and in particular, though not exclusively, relates to a method that is used to reduce imaging lenses geometrical distortion.

2. Description of the Related Art

In general, an imaging device (e.g., digital video camera, an electronic still camera, or other image capturing devices as known by one of ordinary skill in the relevant arts and equivalents) performs photoelectric conversion on an image of a subject obtained through an imaging lens (e.g., a zoom lens or a focusing lens), by an image-sensing element (e.g., a CCD), to generate image signals.

In conventional image capturing devices, optical distortion may be present in the image signals of a captured image depending on the position of a zoom lens. A method for electrically correcting for optical distortion is discussed in, for example, Japanese Patent Laid-Open No. 4-23575.

According to Japanese Patent Laid-Open No. 4-23575, image signals with aberration, and distortion are first stored in a memory, and then the image data in the memory is corrected to a predetermined correction level depending on the zoom lens position. Then, an image in which distortion aberration, which changes depending on the zoom lens position, has been reduced is output.

Moreover, generally, in an image capturing device (e.g., digital video camera), an image-sensing element uses relatively low operating frequency, due to constraints including the manufacturing cost. The low frequency scan is interlaced for output as the image signals. Since the amount of data in the vertical direction in the image signals, based on an interlaced scan is less than that in image signals based on a progressive scan, it is difficult to perform distortion reduction with increased accuracy on image signals resulting from an interlace scan.

Moreover, conventionally, distortion correction is performed after the size of a screen is changed. Thus, for example, when distortion correction is performed after the size of a screen is decreased, information included in image signals is insufficient, and the accuracy of distortion reduction decreases.

SUMMARY OF THE INVENTION

At least one exemplary embodiment is directed to a method for reducing image distortion.

At least one exemplary embodiment is directed to a method for reducing screen-resizing image distortion.

At least one exemplary embodiment is directed to an image-capturing device which includes an image-capturing unit that includes an imaging lens and an image-sensing element converting an image of a subject formed by the imaging lens to an electrical signal and that outputs an image signal based on an interlaced scan, a conversion unit that converts the image signal based on the interlaced scan from the image-capturing unit to an image signal based on a progressive scan, and a distortion-reduction unit that improves the image signal based on the progressive scan from the conversion unit for geometrical distortion caused by the imaging lens.

Further features of the present invention will become apparent from the following description of exemplary embodiments with reference to the attached drawings.

DESCRIPTION OF THE EMBODIMENTS

The following description of exemplary embodiment(s) is merely illustrative in nature and is in no way intended to limit the invention, its application, or uses.

Exemplary embodiments can be operatively connected to various image capturing devices (e.g., electronic cameras, camcorders, digital still cameras, film cameras, broadcast cameras, video cameras, other imaging devices as known by one of ordinary skill, and equivalents) forming imaging systems.

Processes, techniques, apparatus, and materials as known by one of ordinary skill in the art may not be discussed in detail but are intended to be part of the enabling description where appropriate. For example, interpolated line-signal generating circuits and signal combining circuits are discussed. The details of these circuits as known by one of ordinary skill in the relevant art is intended to be part of the enabling discussion and included within the scope of exemplary embodiments.

Additionally exemplary embodiments are not limited to visual imaging devices (e.g., optical photographic systems), for example, the system can be designed for use with infrared and other wavelength imaging systems. Additionally, exemplary embodiments can be used with non-digital systems as well as digital systems (e.g., photographic systems using CCDs).

Notice that similar reference numerals and letters refer to similar items in the following figures, and thus once an item is defined in one figure, it may not be discussed or further defined in the following figures.

First Exemplary Embodiment

Figure 4:
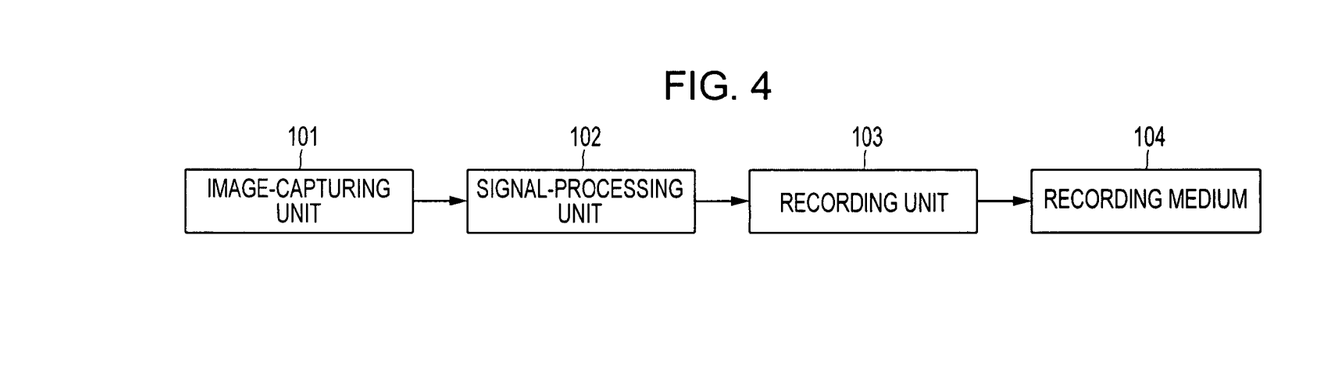
FIG. 4 illustrates a block diagram showing an overall structure of an image-capturing device according to the at least one exemplary embodiment.

FIG. 4 illustrates a block diagram showing the structure of a typical image-capturing device according to at least one exemplary embodiment.

In FIG. 4, the image-capturing device includes an image-capturing unit 101 that captures an image of a subject and outputs image signals as described below, a signal-processing unit 102 that performs encoding on the image signals obtained from the image-capturing unit 101, a recording unit 103, and a recording medium 104. The recording unit 103 records the image signals from the signal-processing unit 102 onto the recording medium 104. A memory card, a disk medium, or other data storage device as known by one of ordinary skill in the relevant arts can be used as the recording medium 104.

The image-capturing device shown in FIG. 4 has a still-image capturing function and a moving-image capturing function, and can output image signals based on the interlaced scan and image signals based on the progressive scan depending on the settings of the image-capturing unit 101.

Figure 1:
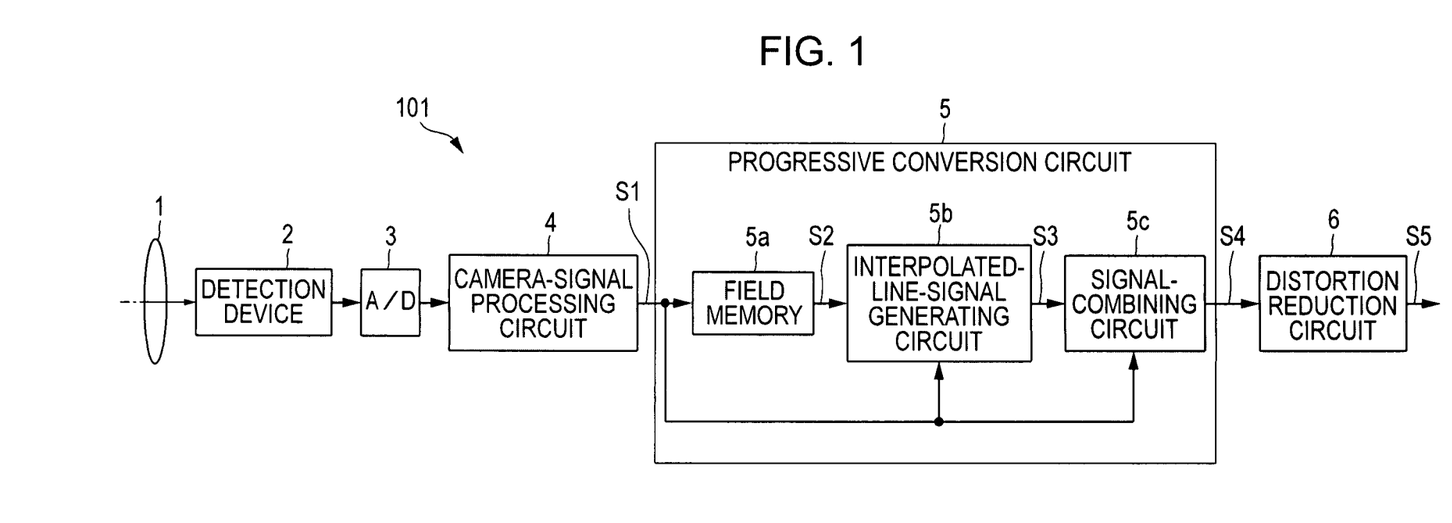
FIG. 1 illustrates a block diagram showing the structure of an image-capturing unit according to a first exemplary embodiment.

Components of the image-capturing unit 101 according to a first exemplary embodiment will now be described.

FIG. 1 illustrates a block diagram showing a typical structure of the image-capturing unit 101.

As shown in FIG. 1, in the image-capturing unit 101, according to the first exemplary embodiment, an image is formed on an image-sensing element (e.g., on a charge coupled device (CCD)) 2 through an imaging lens 1, and image signals based on the interlaced scan are output by the image-sensing element 2. The image signals from the image-sensing element 2 are converted to digital signals based on the interlaced scan by an analog-to-digital (A/D) converter 3, and these digital signals are output to a camera-signal processing circuit 4.

The camera-signal processing circuit 4 performs image system signal processing, for example, aperture correction process, gamma correction process, and white balance correction. Note that although the term "correction" is used to describe certain functions that are performed by the camera-signal processing circuit, the term is intended to include improvements or reduction of errors (e.g., distortion, gamma, white balance, aperture) without complete correction. Image signals S1 that are based on the interlaced scan and that are output signals from the camera-signal processing circuit 4 are input to a progressive conversion circuit 5 and converted to image signals S4 based on the progressive scan.

The progressive conversion circuit 5 will now be described.

Image signals S2 (lagging image signals) are generated from the input image signals S1 using a field memory 5a so as to lag one field period behind the image signals S1.

Then, the image signals S1 and S2 are supplied to an interpolated-line-signal generating circuit 5b, and the interpolated-line-signal generating circuit 5b determines the amount of motion in interpolated lines between fields and determines whether the interpolated lines include edge components in an oblique direction on the basis of the image signals S1 and S2. Then, the interpolated-line-signal generating circuit 5b generates interpolated-line signals S3 by combining the images signals S1 and S2 in a ratio calculated on the basis of the results of these determinations.

Then, the interpolated-line signals S3 and the image signals S1 are supplied to a signal-combining circuit 5c, and the signal-combining circuit 5c generates the image signals S4 by combining the interpolated-line signals S3 and the image signals S1.

Then, a distortion reduction circuit 6 is configured to reduce geometrical distortion of the image signals S4 obtained in the way described above to obtain increased-quality image signals S5 that are distortion reduced.

Figure 8:
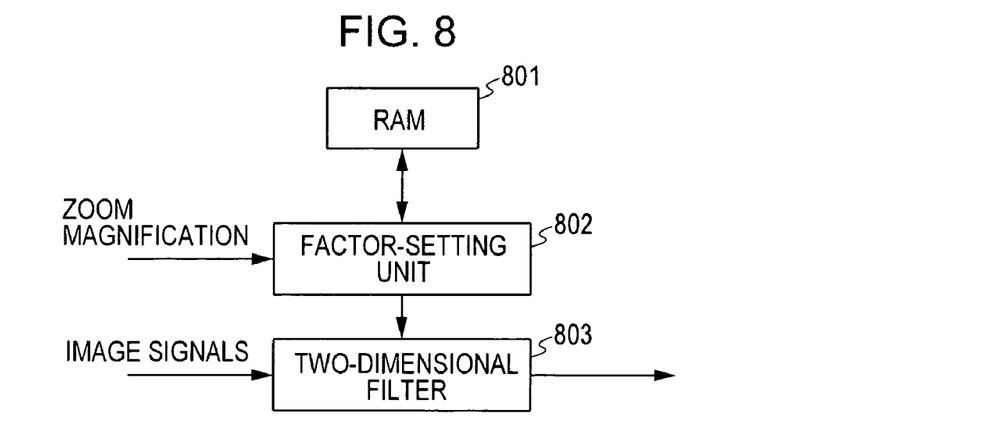
FIG. 8 shows the structure of a distortion reduction circuit.

FIG. 8 illustrates the structure of the distortion reduction circuit 6.

In FIG. 8, a RAM 801 serving as a recording medium stores coordinates of an image formed on the image-sensing element 2 and correction process factors corresponding to zoom magnifications in advance. A factor-setting unit 802 selects one of the correction process factors from the RAM 801 on the basis of data for a zoom magnification, specified from an operation unit (not shown) and sets the selected correction process factor as a filter coefficient of a two-dimensional filter 803. The two-dimensional filter 803 performs two-dimensional filtering process on the input image signals S4 with this correction process factor and outputs image signals that are based on the progressive scan and are distortion reduced. Note that although RAM (e.g., RAM 801) is used for the storage medium, other methods/mediums of data storage can be used within the scope of the exemplary embodiments, for example CD, DVD, Hard Drive Disk, flash memory, other data storage mediums and methods as known by one of ordinary skill in the relevant art and equivalents.

Then, these output image signals are decimated every other line to output the image signals S5 (decimated image signal), which have an increased quality and are based on the interlaced scan. Thus, an increased-quality image with reduced distortion can be obtained.

Next, a method for capturing images according to the first exemplary embodiment will be described with reference to a flowchart.

Figure 5:
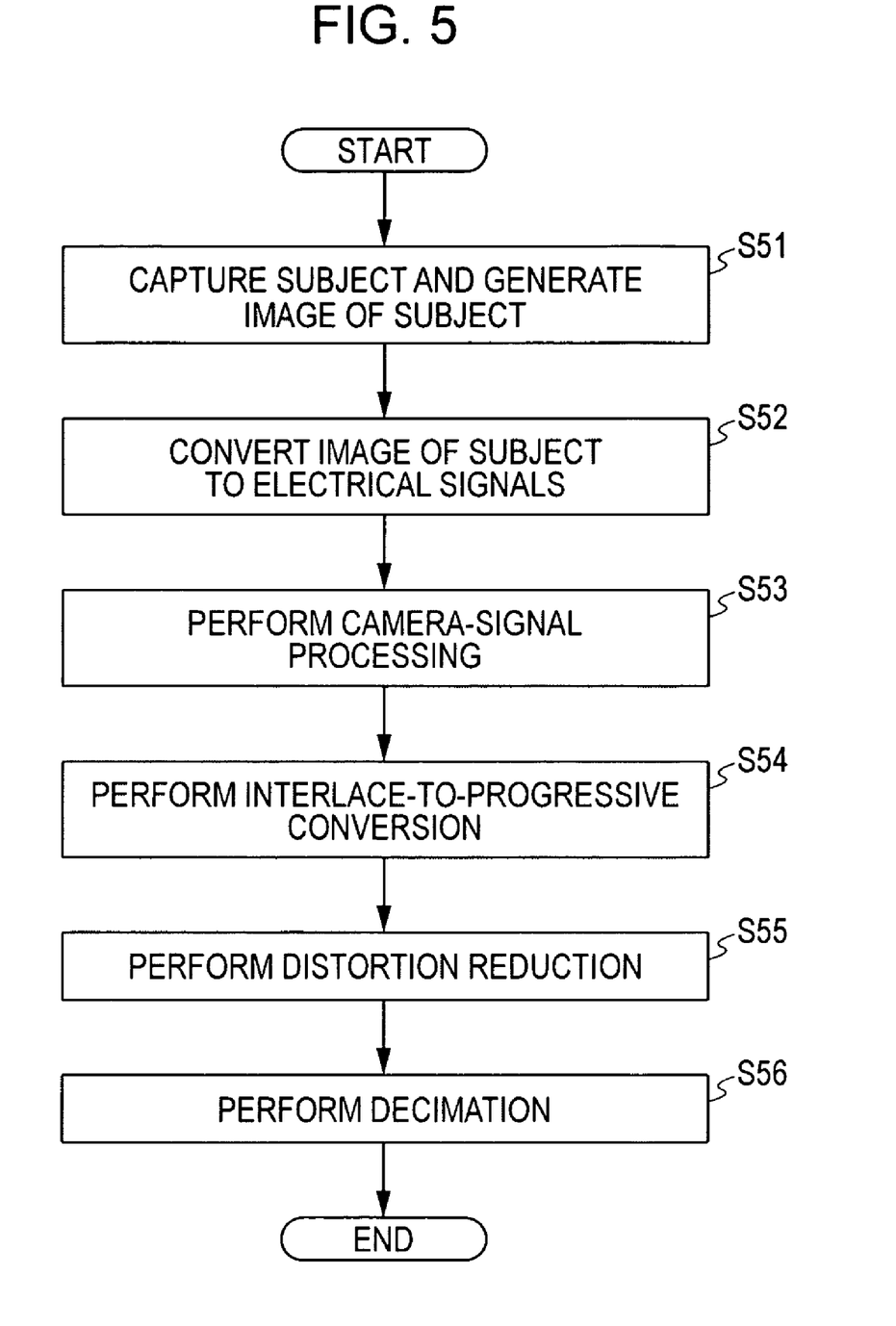
FIG. 5 illustrates a flowchart showing a method for capturing images according to the first exemplary embodiment.

FIG. 5 illustrates a flowchart showing a method for capturing images according to the first exemplary embodiment.

In step S51, a subject is shot/captured, and an image of the subject is formed on the image-sensing element 2.

Then, the process proceeds to step S52 where the image-sensing element 2 performs photoelectric conversion on the image formed on the image-sensing element 2 to generate image signals based on the interlaced scan. These generated image signals are A/D converted to digital image signals.

Then, the process proceeds to step S53 where camera-signal processing is performed on the digital image signals. The camera-signal processing can include aperture correction process, gamma correction process, and white balance correction.

Then, the process proceeds to step S54 where the image signals on which the camera-signal processing is performed are converted to image signals based on the progressive scan.

Then, the process proceeds to step S55 where the image signals based on the progressive scan are distortion reduced. In the method for capturing images according to the first exemplary embodiment, since distortion reduction is performed after the image signals based on the interlaced scan are converted to the image signals based on the progressive scan, distortion reduction can be accurately performed. Distortion reduction is described above in detail and thus not described here.

Then, the process proceeds to step S56 where decimation process of the image signals based on the progressive scan is performed, and increased-quality image signals based on the interlaced scan are output.

Second Exemplary Embodiment

Figure 2:
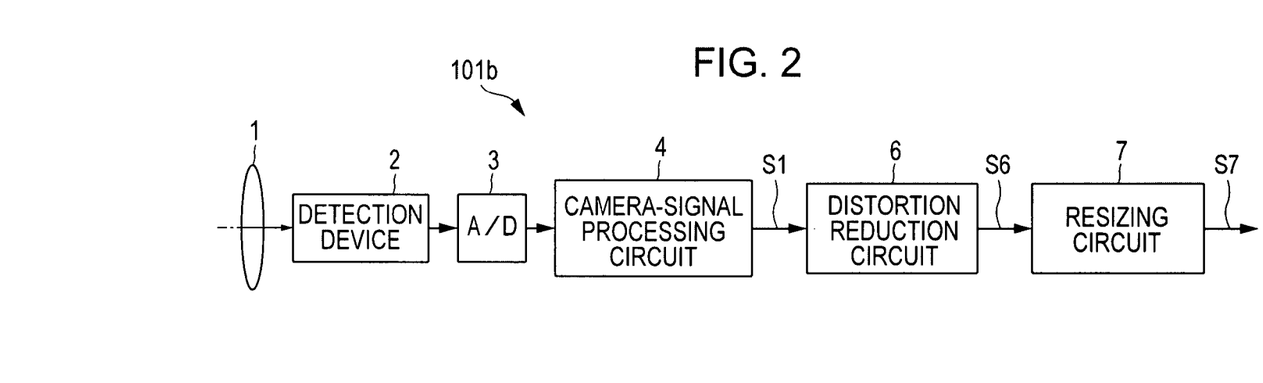
FIG. 2 illustrates a block diagram showing the structure of an image-capturing unit according to a second exemplary embodiment.

An image-capturing unit 101b according to a second exemplary embodiment will now be described.

FIG. 2 shows the structure of the image-capturing unit 101b according to the second exemplary embodiment. In FIG. 2, the same reference numerals as in FIG. 1 are assigned to corresponding components.

In FIG. 2, an A/D converter 3 converts image signals based on the interlaced scan obtained by an image-sensing element 2 (e.g., CCD) to digital signals, and a camera-signal processing circuit 4 processes these digital signals to obtain image signals S1 based on the interlaced scan.

A distortion reduction circuit 6 reduces geometrical distortion of the image signals S1 from the camera-signal processing circuit 4 to obtain image signals S6 that are distortion reduced. The structure of the distortion reduction circuit 6 is shown in FIG. 8.

The image signals S6 from the distortion reduction circuit 6 are output to a resizing circuit 7 and subjected to a resizing process.

The resizing circuit 7 performs predetermined calculations on the image signals S6 from the distortion reduction circuit 6 to decrease or increase the size (the number of pixels) of a screen to a size corresponding to a recording format used in the recording unit 103 or a specified size, and outputs image signals S7 after the resizing process.

Since the image signals S6 to be processed in the resizing circuit 7 are distortion reduced, the image signals S7 from the resizing circuit 7 have an increased quality.

As described above, in this embodiment, image signals are distortion reduced in the distortion reduction circuit 6 before the image signals are subjected to the resizing process in the resizing circuit 7. Thus, distortion reduction can be performed with a large amount of information as compared with a conventional case where image signals are distortion reduced after the image signals are subjected to the resizing process.

Accordingly, the accuracy of distortion reduction can be significantly improved, and increased-quality image signals can be obtained.

Figure 6:
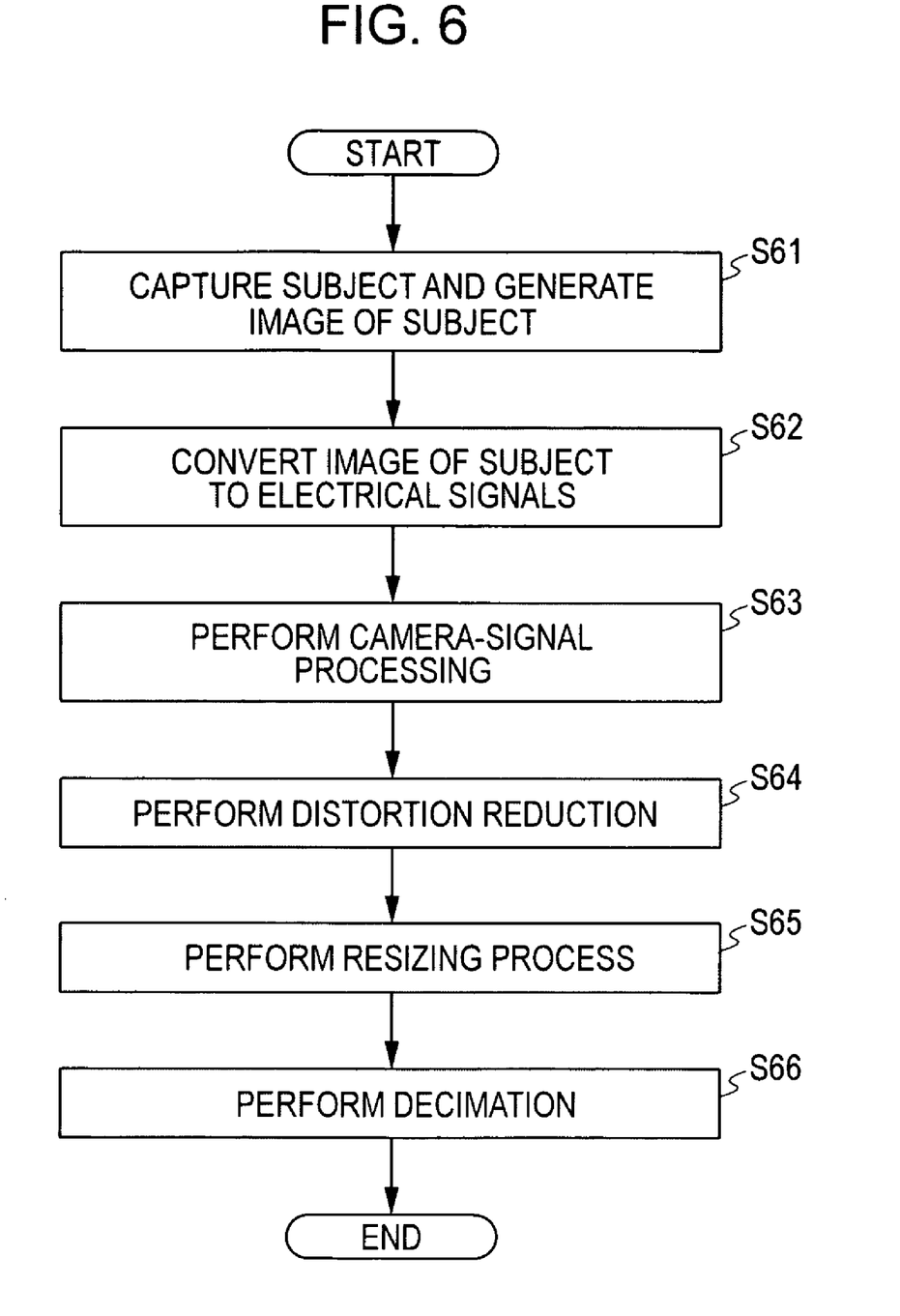
FIG. 6 illustrates a flowchart showing a method for capturing images according to the second exemplary embodiment.

Next, a method for capturing images according to the second exemplary embodiment will be described with reference to a flowchart of FIG. 6. In step S61, a subject is shot/captured, and an image of the subject is formed on the image-sensing element 2.

Then, the process proceeds to step S62 where the image-sensing element 2 performs photoelectric conversion on the image formed on the image-sensing element 2 to generate image signals based on the interlaced scan. These generated image signals are A/D converted to digital image signals.

Then, the process proceeds to step S63 where camera-signal processing is performed on these digital image signals. Camera-signal processing is described above in detail and thus not described here.

Then, the process proceeds to step S64 where image signals based on the progressive scan are distortion reduced. Distortion reduction is described above in detail and thus not described here.

Then, the process proceeds to step S65 where the resizing process of a screen is performed. In the method for capturing images according to the second exemplary embodiment, the resizing process is performed on image signals after distortion reduction. Thus, distortion reduction can be performed with a large amount of data as compared with a conventional case where image signals are distortion reduced after the image signals are subjected to the resizing process. Accordingly, the accuracy of distortion reduction can be significantly improved, and increased-quality image signals can be obtained.

Then, the process proceeds to step S66 where decimation process of the image signals based on the progressive scan is performed, and increased-quality image signals based on the interlaced scan are output.

Third Exemplary Embodiment

Figure 3:
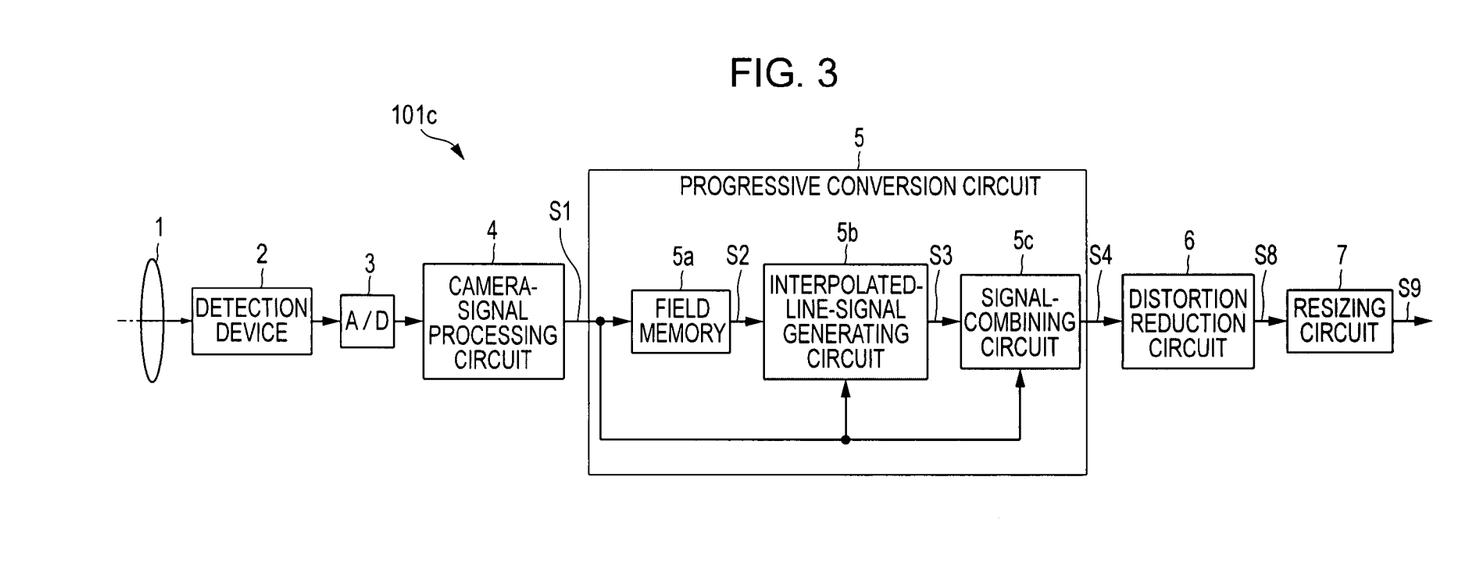
FIG. 3 illustrates a block diagram showing the structure of an image-capturing unit according to a third exemplary embodiment.

An image-capturing unit 101c according to a third exemplary embodiment will now be described.

FIG. 3 illustrates the structure of the image-capturing unit 101c according to the third exemplary embodiment. In FIG. 3, the same reference numerals as in FIGS. 1 and 2 are assigned to corresponding components.

In FIG. 3, an A/D converter 3 converts image signals based on the interlaced scan obtained by an image-sensing element 2 to digital signals, and a camera-signal processing circuit 4 processes these digital signals to obtain image signals S1 based on the interlaced scan.

The image signals S1 from the camera-signal processing circuit 4 are input to a progressive conversion circuit 5 and converted to image signals S4 based on the progressive scan.

The structure of the progressive conversion circuit 5 in FIG. 3 is the same as that in FIG. 1.

A distortion reduction circuit 6 is configured for geometrical distortion reduction of the image signals S4 obtained in the way described above. The structure of the distortion reduction circuit 6 is shown in FIG. 8.

As in FIG. 2, a resizing circuit 7 decreases or increases the size (the number of pixels) of a screen represented by image signals S8 from the distortion reduction circuit 6 to a size corresponding to a recording format used in a recording unit 103 or a specified size, and then decimates even lines or odd lines of the resized screen to obtain image signals based on the interlaced scan and output these image signals as increased-quality image signals S9 after the resizing process.

Alternatively, the distortion reduction circuit 6 can perform scanning-line decimation process. That is to say, the distortion reduction circuit 6 can distortion reduce the image signals S4, based on the progressive scan, and then output image signals based on the interlaced scan after the scanning-line decimation process. In this case, the resizing circuit 7 does not perform scanning-line decimation process but can perform resizing.

As described above, in the third exemplary embodiment, the image signals S4 based on the progressive scan are distortion reduced. Thus, distortion reduction can be performed with more (e.g., twice) as much information in the vertical direction as in a case where image signals based on the interlaced scan are distortion reduced.

Accordingly, the accuracy of distortion reduction can be improved.

Moreover, since image signals are distortion reduced before the image signals are subjected to the resizing process, distortion reduction can be performed with a large amount of data.

Accordingly, the accuracy of distortion reduction can be improved, and increased-quality image signals that are accurately distortion reduced and resized can be output.

Figure 7:
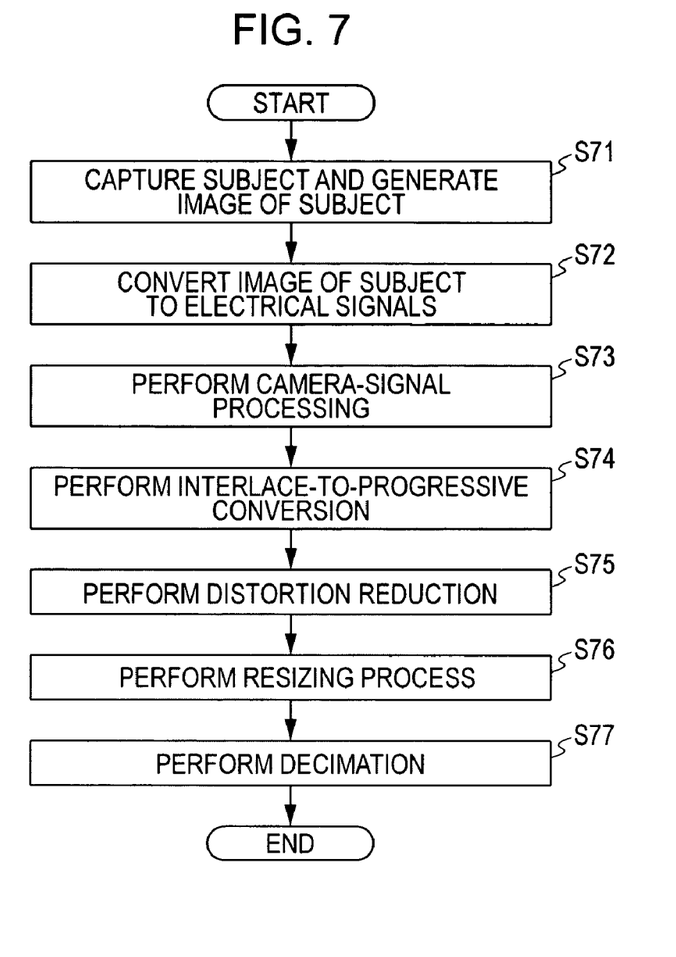
FIG. 7 illustrates a flowchart showing a method for capturing images according to the third exemplary embodiment.

Next, a method for capturing images according to the third exemplary embodiment will be described with reference to a flowchart of FIG. 7. In step S71, a subject is shot, and an image of the subject is formed on the image-sensing sensing element 2.

Then, the process proceeds to step S72 where the image-sensing element 2 performs photoelectric conversion on the image formed on the image-sensing element 2 to generate image signals based on the interlaced scan. These generated image signals are A/D converted to digital image signals.

Then, the process proceeds to step S73 where camera-signal processing is performed on these digital image signals. This camera-signal processing can include aperture correction process, gamma correction process, and white balance correction.

Then, the process proceeds to step S74 where the image signals on which the camera-signal processing is performed are converted to image signals based on the progressive scan.

Then, the process proceeds to step S75 where the image signals based on the progressive scan are distortion reduced. In the method for capturing images according to the third exemplary embodiment, since distortion reduction is performed after the image signals based on the interlaced scan are converted to the image signals based on the progressive scan, distortion reduction can be accurately performed. Distortion reduction is described above in detail and thus not described here.

Then, the process proceeds to step S76 where the resizing process is performed. In the method for capturing images according to the third exemplary embodiment, the resizing process is performed on image signals after interlace-to-progressive conversion and distortion reduction. Thus, distortion reduction can be performed with a large amount of data as compared with a conventional case where image signals based on the interlaced scan are subjected to the resizing process and then distortion reduced. Accordingly, the accuracy of distortion reduction can be significantly improved, and increased-quality image signals can be obtained after the resizing process.

Then, the process proceeds to step S77 where decimation process of the image signals based on the progressive scan is performed, and increased-quality image signals based on the interlaced scan are output.

In the method for capturing images according to the third exemplary embodiment, image signals based on the progressive scan are distortion reduced. Thus, distortion reduction can be performed with more (e.g., twice as much) data in the vertical direction as in a case where image signals based on the interlaced scan are distortion reduced, and the accuracy of distortion reduction can be improved. Moreover, since image signals are distortion reduced before the image signals are subjected to the resizing process, distortion reduction can be performed with a large amount of data. Accordingly, the accuracy of distortion reduction can be improved, and increased-quality image signals that are accurately distortion reduced and resized can be obtained.

Other Exemplary Embodiments

The components constituting the image-capturing device and the steps constituting the method for capturing images according to the foregoing exemplary embodiments can be implemented by executing a program stored in a RAM or a ROM in a computer or in any other computer readable (data) storage medium as known by one of ordinary skill in the relevant arts. Exemplary embodiments include this program and a computer-readable storage medium that stores this program.

Moreover, the exemplary embodiments can be embodied in various forms, for example, a system, a device, a method, a program, or a storage medium. Specifically, exemplary embodiments can be applied to a system including a plurality of units or to a device including a unit.

Exemplary embodiments can be implemented by providing to a system or a device, directly or from a remote site, a software program that performs the functions according to the exemplary embodiments described above (a program corresponding to the flowcharts of FIGS. 5 to 7 in the exemplary embodiments) and by causing a computer included in the system or in the device to read out and execute program codes of the provided software program.

Thus, the exemplary embodiments can be implemented by the program codes, which are installed in the computer to perform the functions according to exemplary embodiments by the computer. That is to say, exemplary embodiments can include a computer program that performs the functions according to at least one exemplary embodiment.

In the case of the program, exemplary embodiments can be embodied in various forms, for example, object codes, a program executed by an interpreter, script data provided for an operating system (OS), so long as they have the program functions described above.

Typical recording media for providing the program are floppy disks, hard disks, optical disks, magneto-optical (MO) disks, CD-ROMs, CD-Rs, CD-RWs, magnetic tapes, non-volatile memory cards, ROMs, or DVDs (DVD-ROMs or DVD-Rs).

Moreover, in a method for distributing the program, users can access a home page on the Internet (e.g., by using a browser on a client computer) and then download the computer program according to at least one exemplary embodiment as is or a file that is generated by compressing the computer program and that has an automatic installation function from the home page to a recording medium, for example, a hard disk.

Moreover, in another method for distributing the program, the program codes constituting the program according to at least one exemplary embodiment can be divided into a plurality of files, and then these files can be downloaded from different home pages. That is to say, an Internet server that allows a plurality of users to download the program files for performing the functions according to at least one exemplary embodiment on a computer is also included in the scope of the present invention.

Moreover, the program according to at least one exemplary embodiment can be encoded and stored in a storage medium, for example, a CD-ROM, and distributed to users. Then, users who satisfy predetermined conditions can download key information for decoding from a home page through the Internet, and the encoded program can be decoded (e.g., using the key information) and installed in a computer to implement at least one exemplary embodiment.

Moreover, an OS operating on a computer can execute some or all of the actual processing to perform the functions of the exemplary embodiments described above according to instructions from the program.

Moreover, the program read out from a recording medium can be written to a memory included in, for example, a function expansion board inserted in a computer or a function expansion unit connected to a computer. Then, for example, a CPU included in the function expansion board, the function expansion unit may execute some or all of the actual processing to perform the functions of the exemplary embodiments described above according to instructions from the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-314527 filed Oct. 28, 2004, which is hereby incorporated by reference herein in its entirety.

What is claimed is:

1. An image-capturing device comprising:
   an image-capturing unit that includes an imaging lens and an image-sensing element configured to convert an image of a subject formed by the imaging lens to an electrical signal, the image-capturing unit outputting an image interlaced signal of an interlaced scan corresponding to the subject;

a signal processing unit configured to perform predetermined image processes including a white balance correction process on the image interlaced signal output from the image-capturing unit;

a conversion unit configured to convert the image interlaced signal output from the signal processing unit to an image progressive signal of a progressive scan and to output the image progressive signal; and a distortion-reduction unit configured to reduce geometrical distortion caused by the imaging lens in the image progressive signal output from the conversion unit and to output a distortion reduced image signal.

2. An image-capturing device comprising:

an image-capturing unit that includes an imaging lens and an image-sensing element configured to convert an image of a subject formed by the imaging lens to an electrical signal, the image-capturing unit outputting an image interlaced signal of an interlaced scan corresponding to the subject;

a signal processing unit configured to perform predetermined image processes including a white balance correction process on the image interlaced signal output from the image-capturing unit;

a conversion unit configured to convert the image interlaced signal output from the signal processing unit to an image progressive signal of a progressive scan and to output the image progressive signal;

a distortion-reduction unit configured to reduce geometrical distortion caused by the imaging lens in the image progressive signal output from the conversion unit and to output a distortion reduced image signal; and a resizing unit configured to change the size of a screen represented by the distortion reduced image signal output from the distortion-reduction unit and to output a resized image signal representing the resized screen.

3. An image-capturing device according to claim 2, wherein the conversion unit comprises:

a field memory;

an interpolated-line-signal generating circuit; and a signal-combining circuit configured to output the image progressive signal.

4. An image-capturing device according to claim 2, wherein the resizing unit includes a decimation unit configured to decimate one of even and odd lines of the resized screen to output the resized image signal of the interlaced scan.

5. The image capturing device according to claim 3, wherein the field memory is used to generate a lagging image signal from an input image signal.

6. The image capturing device according to claim 5, wherein the interpolated-line-signal generating circuit combines the input image signal with the lagging image signal to generate an interpolated-line signal.

7. The image capturing device according to claim 6, wherein the signal-combining circuit generates the image progressive signal by combining the interpolated-line signal and input image signal.

8. An image-capturing device according to claim 2, further comprising:

a recording unit configured to record the resized image signal output from the resizing unit on a recording medium, the changing the size of the distortion reduced image signal according to a recording format of the recording unit.

* * * * *